United States Patent
Li et al.

(10) Patent No.: US 12,313,426 B2
(45) Date of Patent: May 27, 2025

(54) METHOD OF UPDATING MAP DATA, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Zhuang Li, Beijing (CN); Dejin Ge, Beijing (CN); Keyu Pan, Beijing (CN); Wenwen Yu, Beijing (CN); Man Li, Beijing (CN); Zhen Lu, Beijing (CN); Tingting Cao, Beijing (CN); Deguo Xia, Beijing (CN); Jianzhong Yang, Beijing (CN); Tianyu Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 219 days.

(21) Appl. No.: 18/110,256

(22) Filed: Feb. 15, 2023

(65) Prior Publication Data
US 2023/0194302 A1    Jun. 22, 2023

(30) Foreign Application Priority Data
Feb. 16, 2022    (CN) .......................... 202210144064.3

(51) Int. Cl.
*G01C 21/00*    (2006.01)
*H04L 9/32*    (2006.01)

(52) U.S. Cl.
CPC ...... *G01C 21/3833* (2020.08); *G01C 21/3811* (2020.08); *G01C 21/3815* (2020.08); *H04L 9/3213* (2013.01); *H04L 2209/84* (2013.01)

(58) Field of Classification Search
CPC ............ G01C 21/3833; G01C 21/3811; G01C 21/3815; G01C 21/3492; G01C 21/32; G01C 21/3415; H04L 9/3213; H04L 2209/84; G06F 16/2379; G06F 16/29; G06F 40/289
See application file for complete search history.

(56) References Cited

U.S. PATENT DOCUMENTS

2018/0216957 A1    8/2018    Bekkerman et al.

FOREIGN PATENT DOCUMENTS

| CN | 102479436 |   | 5/2012 |   |
|----|-----------|---|--------|---|
| CN | 112100196 |   | 12/2020 |   |
| CN | 113850990 |   | 12/2021 |   |
| CN | 113850990 | A | * 12/2021 | ............... G08G 1/01 |

OTHER PUBLICATIONS

Office Action issued in corresponding Chinese Patent Application No. 202210144064.3, dated Sep. 22, 2023.

* cited by examiner

*Primary Examiner* — Brian P Sweeney
(74) *Attorney, Agent, or Firm* — Pillsbury Winthrop Shaw Pittman, LLP

(57) ABSTRACT

A method of updating map data, an electronic device, and a storage medium, which relate to a field of computer technology, and in particular to intelligent transportation technology. The method of updating map data includes: acquiring a traffic event text, where the traffic event text includes location data and reference direction data; determining candidate road data in the map data based on the location data; determining target road data from the candidate road data based on the reference direction data; updating the target road data based on the traffic event text.

18 Claims, 5 Drawing Sheets

METHOD OF UPDATING MAP DATA, ELECTRONIC DEVICE AND STORAGE MEDIUM

This application claims priority to Chinese Patent Application No. 202210144064.3, filed on Feb. 16, 2022, the entire content of which is incorporated herein in its entirety by reference.

TECHNICAL FIELD

The present disclosure relates to a field of computer technology, in particular to intelligent transportation technology, and more specifically, to a method of updating map data, an electronic device, and a storage medium.

BACKGROUND

With a popularization of the Internet, an electronic map is required for locating and navigation in many scenarios. For an accuracy of locating and navigation, it is usually necessary to update an electronic map in time. For example, when a traffic accident or change occurs on a certain road, it is necessary to update a relevant information of the road in the electronic map in time to avoid affecting the locating and navigation process. However, when updating the electronic map in the related art, the updating cost is high, the efficiency is low, and the updating is not timely enough.

SUMMARY

The present disclosure provides a method of updating map data, an electronic device, and a storage medium.

According to an aspect of the present disclosure, a method of updating map data is provided, including: acquiring a traffic event text, wherein the traffic event text includes location data and reference direction data; determining candidate road data in the map data based on the location data; determining target road data from the candidate road data based on the reference direction data; updating the target road data based on the traffic event text.

According to another aspect of the present disclosure, an electronic device is provided, including: at least one processor; and a memory communicatively connected to the at least one processor, wherein the memory stores instructions executable by the at least one processor, and the instructions, when executed by the at least one processor, are configured to cause the at least one processor to implement the method of updating map data as described above.

According to another aspect of the present disclosure, a non-transitory computer-readable storage medium having computer instructions therein is provided, wherein the computer instructions are configured to cause a computer system to implement the method of updating map data as described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The terms used herein are only intended to describe specific embodiments and are not intended to limit the disclosure. The terms "comprise", "include", "contain", etc., used herein indicate the existence of the described feature, step, operation and/or component, but do not exclude the existence or addition of one or more other features, steps, operations or components.

All terms (including technical and scientific terms) used herein have meanings generally understood by those skilled in the art, unless otherwise defined. It should be noted that the terms used here should be interpreted as having the meaning consistent with the context of this specification, and should not be interpreted in an idealized or too rigid way.

In a case of using an expression similar to "at least one selected from A, B, or C", it should generally be interpreted in accordance with the meaning of the expression generally understood by those skilled in the art (for example, "a system having at least one selected from A, B, or C" should include, but not be limited to, a system having A alone, a system having B alone, a system having C alone, a system having A and B, a system having A and C, a system having B and C, and/or a system having A, B, and C, etc.).

Figure 1:
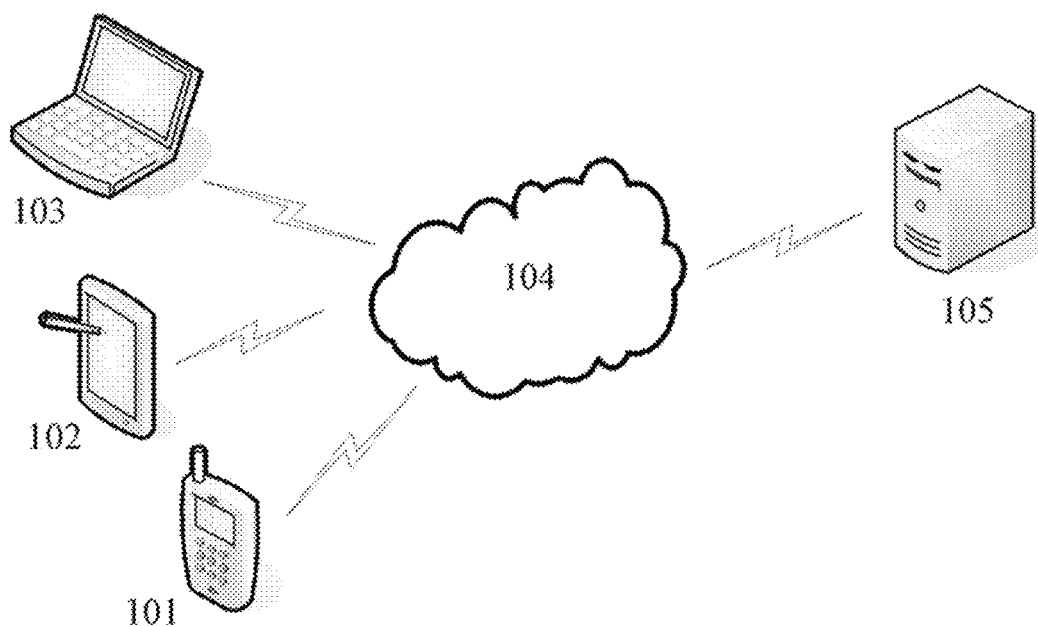
FIG. 1 schematically shows a system architecture of updating map data according to an embodiment of the present disclosure.

FIG. 1 schematically shows a system architecture of updating map data according to an embodiment of the present disclosure. It should be noted that FIG. 1 only shows an example of the system architecture to which embodiments of the present disclosure may be applied to help those skilled in the art understand the technical content of the present disclosure, but it does not mean that embodiments of the disclosure may not be applied to other devices, systems, environments or scenarios.

As shown in FIG. 1, a system architecture 100 according to such embodiment may include clients 101, 102, 103, a network 104, and a server 105. The network 104 is a medium used to provide a communication link between the clients 101, 102, 103 and the server 105. The network 104 may include various connection types, such as wired, wireless communication links or optical fiber cables, among others.

The clients 101, 102, 103 may be used by a user to interact with the server 105 via the network 104, so as to receive or send messages, etc. The clients 101, 102 and 103 may be installed with various communication client applications, such as shopping applications, web browser applications, search applications, instant messaging tools, email clients, social platform software, etc., (just for example).

The clients 101, 102, 103 may be various electronic devices having display screens and supporting web browsing, including but not limited to smartphones, tablets, laptops, desktops, etc. The clients 101, 102 and 103 in embodiments of the present disclosure may run, for example, application programs.

The server 105 may be a server that provides various services, such as a background management server (for example only) that provides a support for a website browsed by the user using the clients 101, 102, and 103. The background management server may analyze and process a received user request and other data, and feed back a processing result (e.g., web page, information or data acquired or generated according to the user request) to the clients. In addition, the server 105 may also be a cloud server, that is, the server 105 has cloud computing functions.

It should be noted that a method of updating map data provided in embodiments of the present disclosure may be implemented by the clients 101, 102, 103. Correspondingly, an apparatus of updating map data provided in embodiments of the present disclosure may be provided in the clients 101, 102, 103.

In an example, the server 105 may process a traffic event text to update the map data. The server 105 may send the updated map data to the clients 101, 102, 103, so that the clients 101, 102, 103 may locate and navigate based on the updated map data. Alternatively, the clients 101, 102, 103 may send a navigation and locating request to the server 105. The server 105 conducts navigation and locating based on the updated map data, obtains the navigation and locating results, and sends the navigation and locating results to the clients 101, 102, 103.

It should be understood that the number of clients, network and server shown in FIG. 1 is only schematic. There may be any number of clients, networks and servers according to the actual requirements.

In the present disclosure, map data may be updated based on a locating link technology. In combination with the system architecture of FIG. 1, a method of updating map data according to exemplary embodiments of the present disclosure is described below with reference to FIGS. 2 to 5. The method of updating map data of embodiments of the present disclosure may be implemented by the server shown in FIG. 1, for example, the server shown in FIG. 1 is the same or similar with the electronic device described below.

Figure 2:
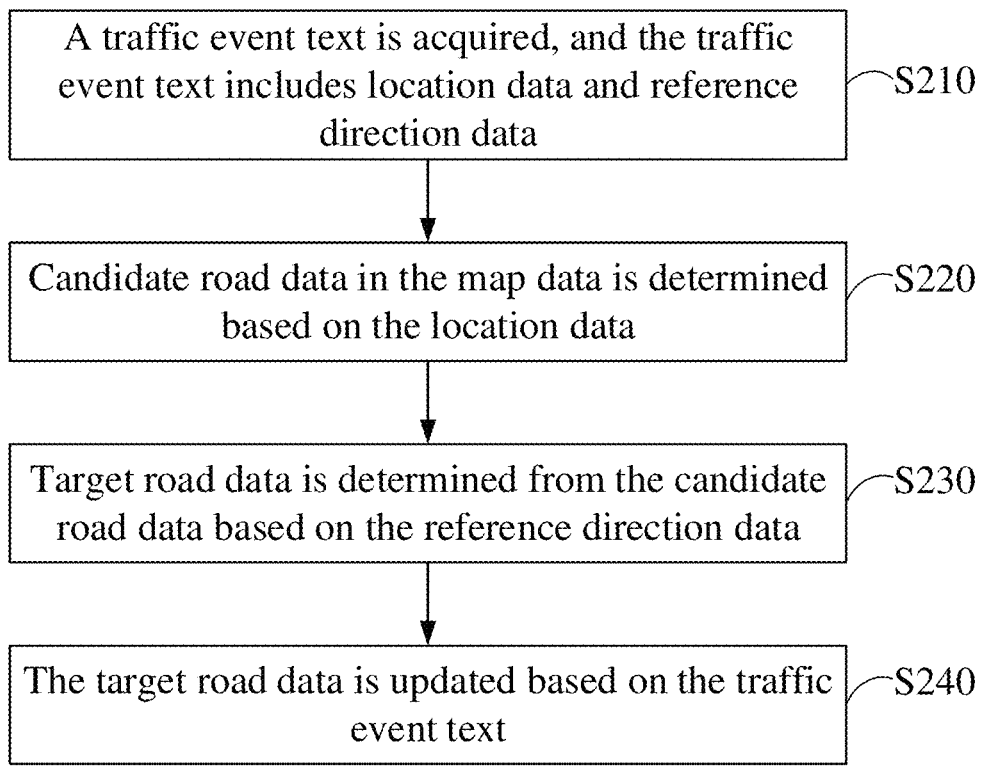
FIG. 2 schematically shows a flowchart of a method of updating map data according to an embodiment of the present disclosure.

FIG. 2 schematically shows a flowchart of a method of updating map data according to an embodiment of the present disclosure.

As shown in FIG. 2, the method 200 of updating map data in the embodiment of the present disclosure may include, for example, operations S210 to S240.

In operation S210, a traffic event text is acquired, where the traffic event text includes location data and reference direction data.

In operation S220, candidate road data in the map data is determined based on the location data.

In operation S230, target road data is determined from the candidate road data based on the reference direction data.

In operation S240, the target road data is updated based on the traffic event text.

In an example, the traffic event text includes, for example, a traffic dynamic event officially released, which has high timeliness and accuracy. The location data in the traffic event text represents, for example, a road on which an event occurs, and the reference direction data represents, for example, a direction of the road on which the event occurs.

After acquiring the traffic event text, the traffic event text may be processed to obtain the location data and the reference direction data. Then, at least one candidate road data may be determined from the map data based on the location data, and the target road data may be determined from the at least one candidate road data based on the reference direction data. A target road corresponding to the target road data is a road on which the event occurs. One road data may represent one link.

After determining the target road data, the target road data in the map data may be updated based on the traffic event text, thereby updating the map data in time.

According to embodiments of the present disclosure, as the timeliness and the accuracy of the traffic event text are improved, the map data is updated based on the traffic event text, a cost for updating the map data may be reduced and the accuracy and the timeliness for updating the map data may be improved.

In an example, the traffic event text includes a road condition information. For example, the road condition information represents whether an accident occurs on the road or not, whether the road is under construction or not, and so on. For the target road corresponding to the target road data, a road condition data for the target road may be updated in the map data based on the road condition information. In subsequent navigation, navigation may be performed based on the updated map data to avoid passing through the road on which the accident occurs and the road under construction, so as to improve a navigation effect.

In an example, a tokenization may be performed on the traffic event text to obtain a road identification and a road stake number. Then, the location data is determined based on the road identification and the road stake number.

For example, the traffic event text includes: "At 16:38 on Dec. 1, 2021, 2090K to 2084K of expressway section A in a direction from place a to place b is under construction". The tokenization may be performed on the traffic event text to extract the road identification "expressway section A" and the road stake numbers "2090K" and "2084K", and the location data may be determined based on the road identification and the road stake numbers.

In addition, it is also possible to perform the tokenization on the traffic event text to extract the reference direction data "direction to place b".

According to embodiments of the present disclosure, in order to update the map data based on the traffic event text, it is necessary to perform a tokenization on the traffic event text to obtain the road identification, the road stake number and the reference direction data, so as to determine the target road on which the event occurs from the map data based on the road identification, the road stake number and the reference direction data.

Figure 3:
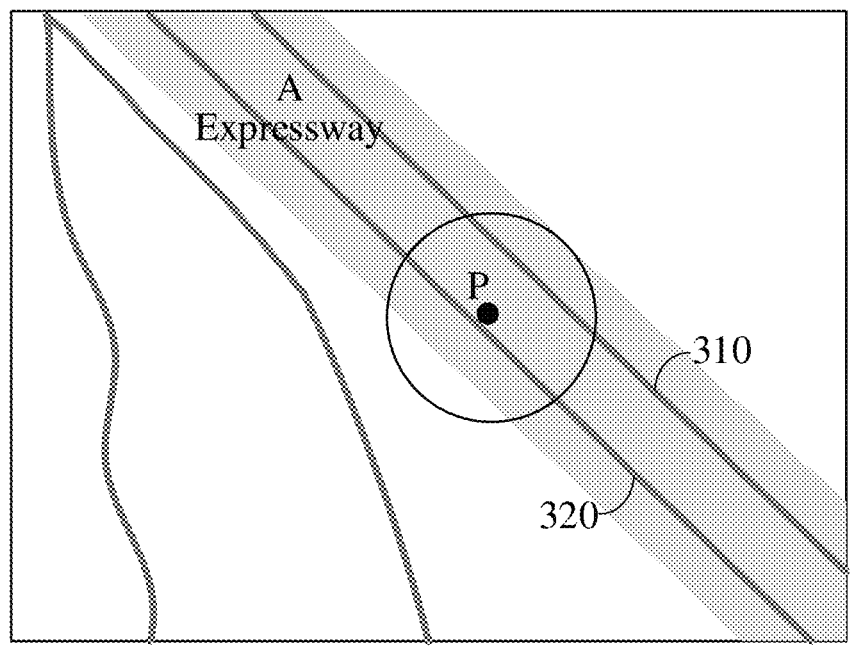
FIG. 3 schematically shows a schematic diagram of a method of updating map data according to an embodiment of the present disclosure.

FIG. 3 schematically shows a method of updating map data according to an embodiment of the present disclosure.

As shown in FIG. 3, a coordinate point P is located based on a road identification and a road stake number, and the coordinate point P is used as the location data.

Then, a preset region is determined based on the location data and a reference road size, and the preset region is a circular region shown in FIG. 3. The reference road size may include, for example, an overall width of a standard six-lane, the overall width is, for example, 21.6 m. In other words, the preset region is determined with the coordinate point P as a center and the overall width of 21.6 m as a diameter.

Then, road data within the preset region is determined from the map data as the candidate road data. For example, candidate road data 310 and candidate road data 320 are determined.

Figure 4:
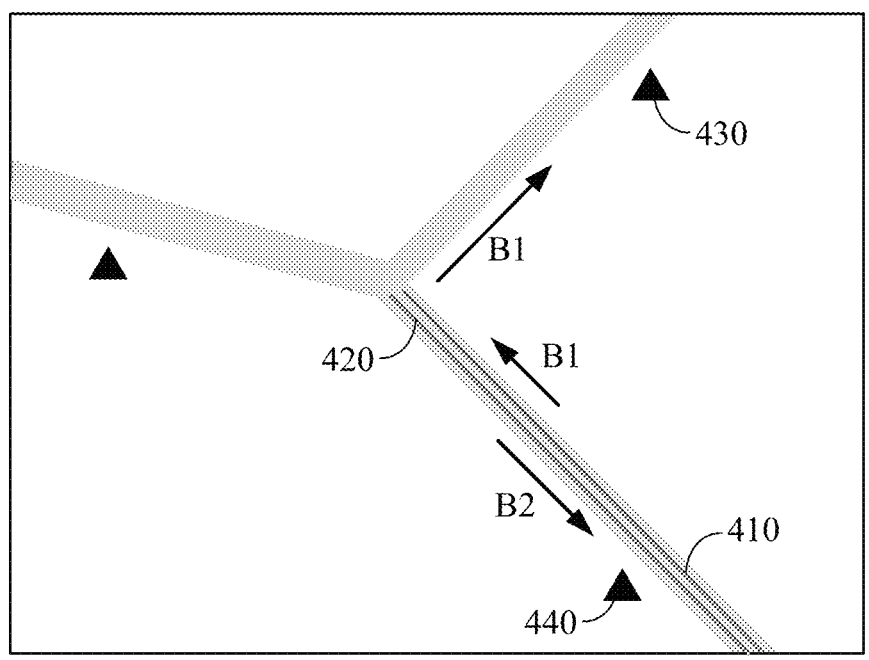
FIG. 4 schematically shows a schematic diagram of a method of updating map data according to another embodiment of the present disclosure.

FIG. 4 schematically shows a method of updating map data according to another embodiment of the present disclosure.

As shown in FIG. 4, after determining candidate road data 410 and candidate road data 420, it is necessary to determine a target road data from the candidate road data 410 and the candidate road data 420. A target road corresponding to the target road data is a road on which an event occurs.

For example, target direction data for each candidate road is determined based on each candidate road data. If the target direction data is consistent with the reference direction data, the candidate road data is determined as the target road data.

In an example, a geographic object is determined from the map data with a direction for each candidate road data as a search direction, and then a first address identification is determined from attribute data of the geographic object. The first address identification may be used as the target direction data. The first address identification indicates going to a first address by passing the geographic object, and the first address corresponds to the first address identification.

For example, for the candidate road data 410, a direction for the candidate road data 410 is B1, and the direction B1 represents a traveling direction of a vehicle on the road. By taking the direction B1 as the search direction, a nearest geographic object 430 is determined from the map data, and the geographic object 430 includes, for example, a toll station, a gas station and/or other points of interest. If no geographic object is obtained based on the candidate road data 410, then the search for a geographic object based on other road data associated with the candidate road data 410 continues.

For example, for the candidate road data 420, a direction for the candidate road data 420 is B2, and the direction B2 represents the traveling direction of the vehicle on the road. By taking the direction B2 as the search direction, a nearest geographic object 440 is determined from the map data, and the geographic object 440 includes, for example, a toll station, a gas station and/or other points of interest.

In the database, the geographic object 430 and the geographic object 440 usually have attribute data, and the attribute data includes a first address identification. For example, a first address identification for the geographic object 430 is, for example, "place b", which indicates going to place b by passing the geographic object 430; and a first address identification for the geographic object 440 is, for example, "place c", which indicates going to place c by passing the geographic object 440.

Referring to the traffic event text above, the reference direction data extracted from the traffic event text includes, for example, a second address identification, and the second address identification may be, for example, "place b". As the first address identification "place b" for the geographic object 430 is consistent with the second address identification "place b", the candidate road data 410 may be determined as the target road data.

According to embodiments of the present disclosure, after determining the candidate road data, the geographic object may be searched based on the direction for the candidate road data, and the target direction data for the candidate road data is determined based on the attribute data of the searched geographic object. Then, based on the target direction data and the reference direction data in the traffic event text, the target road data on which an event occurs is determined, thereby achieving locating a place where the event occurs based on the traffic event text, and improving the accuracy of updating map data based on the traffic event text.

Figure 5:
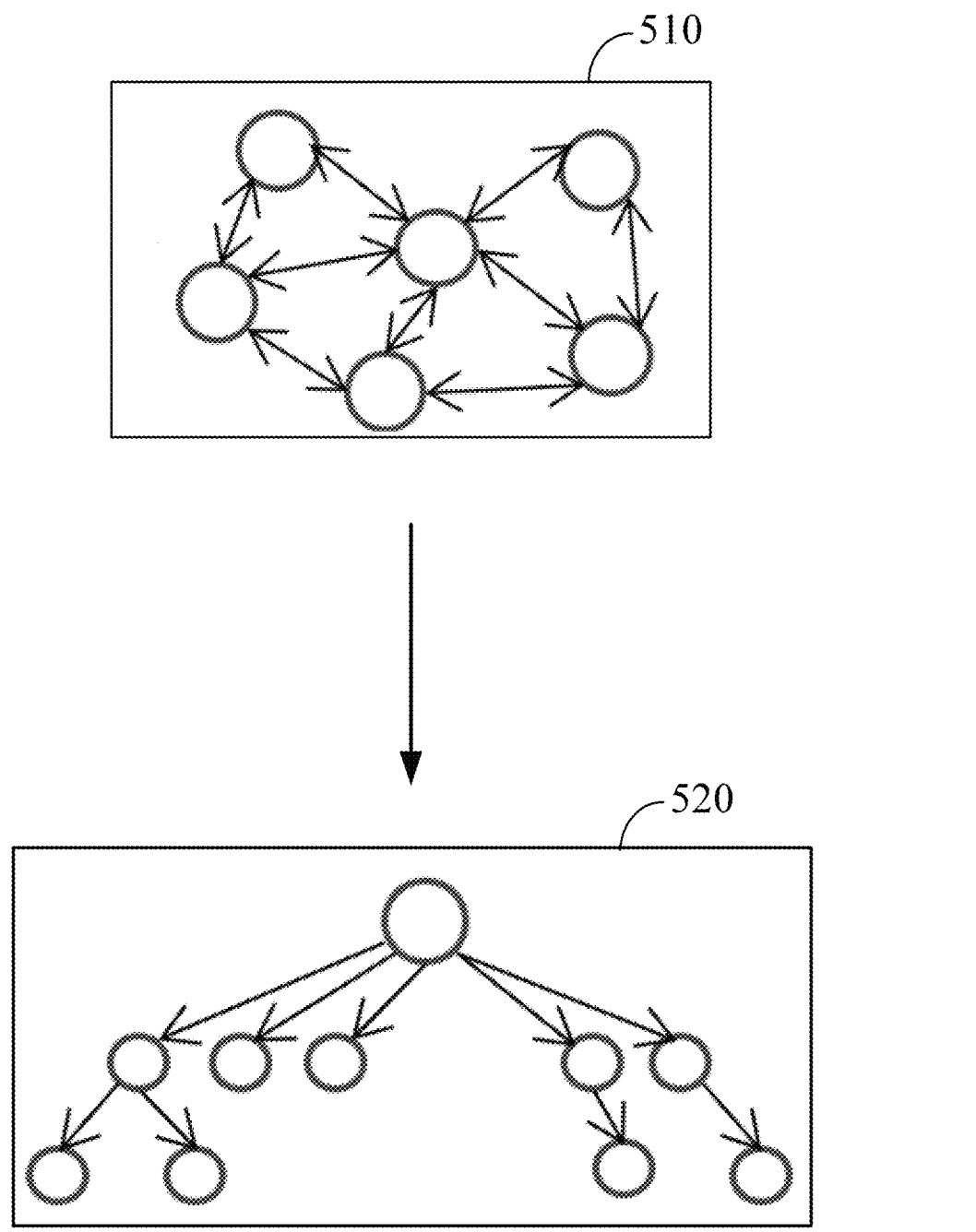
FIG. 5 schematically shows a schematic diagram of a topological relationship graph according to an embodiment of the present disclosure.

FIG. 5 schematically shows a schematic diagram of a topological relationship graph according to an embodiment of the present disclosure.

As shown in FIG. 5, a topological relationship graph 520 is constructed based on a connection relationship 510 between a plurality of road data. The plurality of road data include the candidate road data, and each of the plurality of road data is used as a node. A hollow circle shown in FIG. 5 represents a node.

In an example, the geographic object may be searched by using Depth-First-Search (DFS). For example, it may be possible to determine, in the topological relationship graph 520, an associated node in turn with a node for the candidate road data as a starting point, and the geographic object is determined from the map data based on the node.

For example, for a certain candidate road data, the direction for the candidate road data is taken as the search direction to search for a geographic object. If no geographic object is obtained, a next node is determined as a first node based on the node for the candidate road. The first node corresponds to road data. A direction for the road data corresponding to the first node is taken as the search direction to continue searching for a geographic object. If no geographic object is obtained, a next node is determined as a second node based on the first node, so as to continue to search until the geographic object is obtained.

According to embodiments of the present disclosure, the speed and the efficiency of searching the geographical object are improved by constructing the topological relationship graph to search for the geographical object, thereby improving the efficiency of updating map data.

Figure 6:
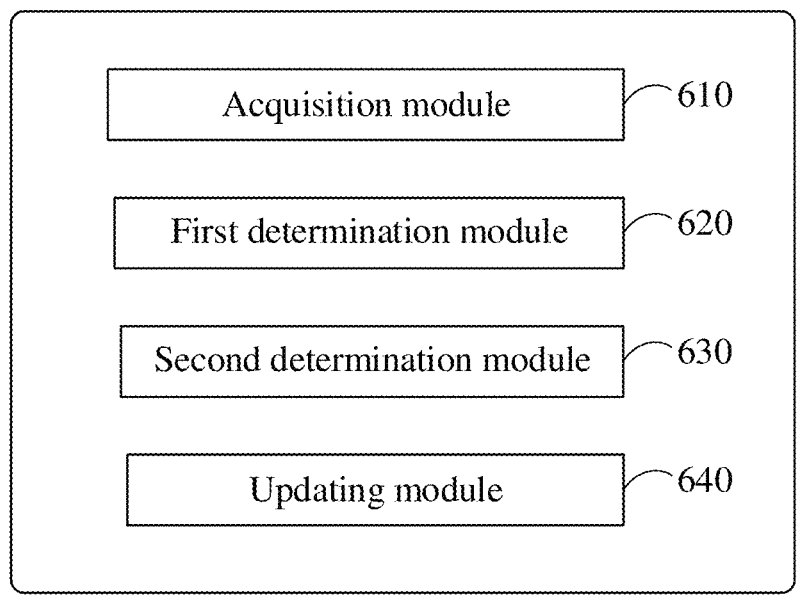
FIG. 6 schematically shows a block diagram of an apparatus of updating map data according to an embodiment of the present disclosure.

FIG. 6 schematically shows a block diagram of an apparatus of updating map data according to an embodiment of the present disclosure.

As shown in FIG. 6, an apparatus 600 of updating map data in embodiments of the present disclosure includes, for example, an acquisition module 610, a first determination module 620, a second determination module 630, and an updating module 640.

The acquisition module 610 may be used to acquire a traffic event text, where the traffic event text includes location data and reference direction data. According to embodiments of the present disclosure, the acquisition module 610 may, for example, perform the operation S210 described above with reference to FIG. 2, which will not be repeated here.

The first determination module 620 may be used to determine candidate road data in the map data based on the location data. According to embodiments of the present disclosure, the first determination module 620 may, for example, perform the operation S220 described above with reference to FIG. 2, which will not be repeated here.

The second determination module 630 may be used to determine target road data from the candidate road data based on the reference direction data. According to embodiments of the present disclosure, the second determination module 630 may, for example, perform the operation S230 described above with reference to FIG. 2, which will not be repeated here.

The updating module 640 may be used to update the target road data based on the traffic event text. According to embodiments of the present disclosure, the updating module 640 may, for example, perform the operation S240 described above with reference to FIG. 2, which will not be repeated here.

According to embodiments of the present disclosure, the second determination module 630 includes a first determination sub-module and a second determination sub-module. The first determination sub-module is used to determine target direction data based on the candidate road data; and the second determination sub-module is used to determine the candidate road data as the target road data, in response to determining that the target direction data is consistent with the reference direction data.

According to embodiments of the present disclosure, the first determination sub-module includes a first determination unit and a second determination unit. A first determination unit is used to determine a geographic object from the map data with a direction for the candidate road data as a search direction; and the second determination unit is used to determine, from attribute data of the geographic object, a first address identification as the target direction data, where the first address identification indicates going to a first address by passing the geographic object, and the first address corresponds to the first address identification.

According to embodiments of the present disclosure, the reference direction data includes a second address identification; and the second determination sub-module is further used to: determine the candidate road data as the target road data, in response to determining that the first address identification is consistent with the second address identification.

According to embodiments of the present disclosure, the first determination unit is further used to: determine, in a topological relationship graph, an associated node in turn with a node for the candidate road data as a starting point, and determine the geographic object from the map data based on the node, where the topological relationship graph is constructed based on a connection relationship between a plurality of road data, and wherein the plurality of road data comprise the candidate road data, and each of the plurality of road data is used as one node.

According to embodiments of the present disclosure, the first determination module 620 includes a third determination sub-module and a fourth determination sub-module. The third determination sub-module is used to determine a preset region based on the location data and a reference road size; and the fourth confirmation sub-module is used to determine, from the map data, road data within the preset region as the candidate road data.

According to embodiments of the present disclosure, the apparatus 600 may further include a tokenization module and a third determination module. The tokenization module is used to perform a tokenization on the traffic event text to obtain a road identification and a road stake number; and the third determination module is used to determine the location data based on the road identification and the road stake number.

According to embodiments of the present disclosure, the traffic event text includes a road condition information; and the updating module 640 is further used to update a road condition of a target road corresponding to the target road data based on the road condition information.

In the technical solution of this disclosure, collecting, storing, using, processing, transmitting, providing, and disclosing etc. of the road condition information, the location information, etc., involved in the present disclosure all comply with the relevant laws and regulations, are protected by essential security measures, and do not violate the public order and morals.

In the technical solution of this disclosure, the user's authorization or consent is obtained before the user's personal information is acquired or collected.

According to embodiments of the present disclosure, the present disclosure further provides an electronic device, a readable storage medium, and a computer program product.

Figure 7:
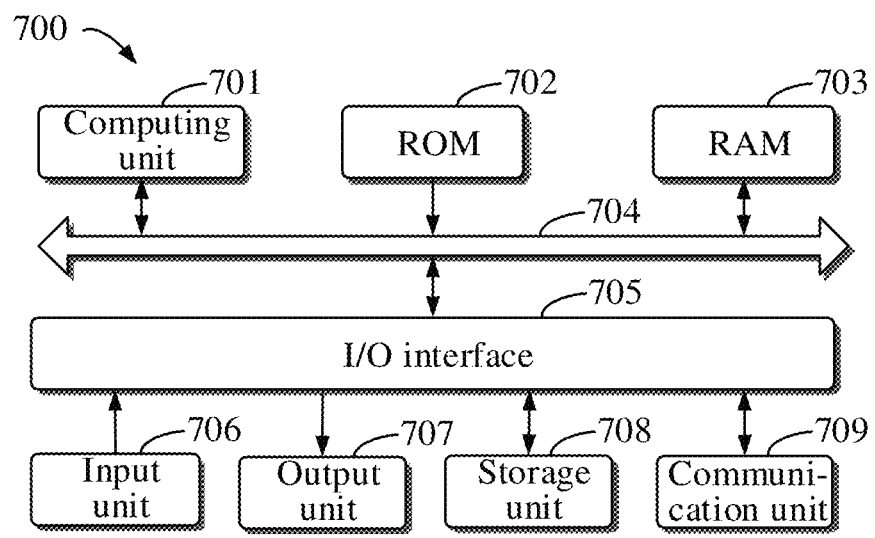
FIG. 7 is a block diagram of an electronic device for implementing a method of updating map data according to an embodiment of the present disclosure.

FIG. 7 is a block diagram of an electronic device for implementing a method of updating map data according to an embodiment of the present disclosure.

FIG. 7 shows a schematic block diagram of an example electronic device 700 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 may include a computing unit 701, which may perform various appropriate actions and processing based on a computer program stored in a read only memory (ROM) 702 or a computer program loaded from a storage unit 708 into a random access memory (RAM) 703. Various programs and data required for the operation of the electronic device 700 may be stored in the RAM 703. The computing unit 701, the ROM 702 and the RAM 703 are connected to each other through a bus 704. An input/output (I/O) interface 705 is also connected to the bus 704.

Various components in the electronic device 700 are connected to the I/O interface 705, including an input unit 706, such as a keyboard, a mouse, etc.; an output unit 707, such as various types of displays, speakers, etc.; a storage unit 708, such as a magnetic disk, an optical disk, etc.; and a communication unit 709, such as a network card, a modem, a wireless communication transceiver, etc. The communication unit 709 allows the electronic device 700 to exchange information/data with other devices through a computer network such as the Internet and/or various telecommunication networks.

The computing unit 701 may be various general-purpose and/or dedicated processing components with processing and computing capabilities. Some examples of the computing unit 701 include, but are not limited to, a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 701 may perform the various methods and processes described above, such as the method of updating map data. For example, in some embodiments, the method of updating map data may be implemented as a computer software program that is tangibly contained on a machine-readable medium, such as a storage unit 708. In some embodiments, part or all of a computer program may be loaded and/or installed on the electronic device 700 via the ROM 702 and/or the communication unit 709. When the computer program is loaded into the RAM 703 and executed by the computing unit 701, one or more steps of the method of updating map data described above may be performed. Alternatively, in other embodiments, the computing unit 701 may be configured to perform the method of updating map data in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable apparatuses of updating map data, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

A computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A computer-implemented method of updating electronic map data, the method comprising:
   acquiring a traffic event text, wherein the traffic event text comprises location data and reference direction data, and the traffic event text comprises a traffic dynamic event officially released;
   determining candidate road data in the electronic map data based on the location data;
   determining target road data from the candidate road data based on the reference direction data; and
   updating the target road data based on the traffic event text, to obtain the updated electronic map for navigation,
   wherein the determining target road data from the candidate road data based on the reference direction data comprises:
      determining target direction data based on the candidate road data; and determining the candidate road data as the target road data, in response to determining that the target direction data is consistent with the reference direction data, and wherein the determining target direction data based on the candidate road data comprises:
- determining a geographic object from the electronic map data with a direction for the candidate road data as a search direction; and
- determining, from attribute data of the geographic object, a first address identification as the target direction data, wherein the first address identification indicates going to a first address by passing the geographic object, and the first address corresponds to the first address identification.

2. The method of claim 1, wherein the reference direction data comprises a second address identification, and wherein the determining the candidate road data as the target road data in response to determining that the target direction data is consistent with the reference direction data comprises determining the candidate road data as the target road data, in response to determining that the first address identification is consistent with the second address identification.

3. The method of claim 1, wherein the determining a geographic object from the electronic map data with a direction for the candidate road data as a search direction comprises determining, in a topological relationship graph, an associated node in turn with a node for the candidate road data as a starting point, and determining the geographic object from the electronic map data based on the node, wherein the topological relationship graph is constructed based on a connection relationship between a plurality of road data, and wherein the plurality of road data comprise the candidate road data, and each of the plurality of road data is used as one node.

4. The method of claim 1, wherein the determining a candidate road data in the electronic map data based on the location data comprises:
- determining a preset region based on the location data and a reference road size; and
- determining, from the electronic map data, road data within the preset region as the candidate road data.

5. The method of claim 1, further comprising:
- performing a tokenization on the traffic event text to obtain a road identification and a road stake number; and
- determining the location data based on the road identification and the road stake number.

6. The method of claim 1, wherein the traffic event text comprises a road condition information, and wherein the updating the target road data based on the traffic event text comprises updating a road condition of a target road corresponding to the target road data based on the road condition information.

7. An electronic device, comprising:
- at least one processor; and
- a memory communicatively connected to the at least one processor, wherein the memory stores instructions executable by the at least one processor, and the instructions, when executed by the at least one processor, are configured to cause the at least one processor to at least:

acquire a traffic event text, wherein the traffic event text comprises location data and reference direction data, and the traffic event text comprises a traffic dynamic event officially released;

determine candidate road data in electronic map data based on the location data;

determine target road data from the candidate road data based on the reference direction data; and update the target road data based on the traffic event text, to obtain the updated electronic map data for navigation, wherein the determination of the target road data from the candidate road data based on the reference direction data comprises:
- determination of target direction data based on the candidate road data; and
- determination of the candidate road data as the target road data, in response to determination that the target direction data is consistent with the reference direction data, and wherein the determination of the target direction data based on the candidate road data comprises:
- determination of a geographic object from the electronic map data with a direction for the candidate road data as a search direction; and
- determination, from attribute data of the geographic object, a first address identification as the target direction data, wherein the first address identification indicates going to a first address by passing the geographic object, and the first address corresponds to the first address identification.

8. The electronic device of claim 7, wherein the reference direction data comprises a second address identification, and wherein the instructions are further configured to cause the at least one processor to at least determine the candidate road data as the target road data, in response to determining that the first address identification is consistent with the second address identification.

9. The electronic device of claim 7, wherein the instructions are further configured to cause the at least one processor to at least determine, in a topological relationship graph, an associated node in turn with a node for the candidate road data as a starting point, and determine the geographic object from the electronic map data based on the node, wherein the topological relationship graph is constructed based on a connection relationship between a plurality of road data, and wherein the plurality of road data comprise the candidate road data, and each of the plurality of road data is used as one node.

10. The electronic device of claim 7, wherein the instructions are further configured to cause the at least one processor to at least:
- determine a preset region based on the location data and a reference road size; and
- determine, from the electronic map data, road data within the preset region as the candidate road data.

11. The electronic device of claim 7, wherein the instructions are further configured to cause the at least one processor to at least:
- perform a tokenization on the traffic event text to obtain a road identification and a road stake number; and
- determine the location data based on the road identification and the road stake number.

12. The electronic device of claim 7, wherein the traffic event text comprises a road condition information, and wherein the instructions are further configured to cause the at least one processor to at least update a road condition of a target road corresponding to the target road data based on the road condition information.

13. A non-transitory computer-readable storage medium having computer instructions therein, wherein the computer instructions are configured to cause a computer system to at least:
   acquire a traffic event text, wherein the traffic event text comprises location data and reference direction data, and the traffic event text comprises a traffic dynamic event officially released;
   determine candidate road data in electronic map data based on the location data;
   determine a geographic object from the electronic map data with a direction for the candidate road data as a search direction;
   determine, from attribute data of the geographic object, a first address identification as being target direction data, wherein the first address identification indicates going to a first address by passing the geographic object, and the first address corresponds to the first address identification;
   determine the candidate road data as target road data, in response to determination that the target direction data is consistent with the reference direction data; and
   update the target road data based on the traffic event text, to obtain the updated electronic map data for navigation.

14. The non-transitory computer-readable storage medium of claim 13, wherein the reference direction data comprises a second address identification, and
   wherein the computer instructions are further configured to cause the computer system to at least determine the candidate road data as the target road data, in response to determining that the first address identification is consistent with the second address identification.

15. The non-transitory computer-readable storage medium of claim 13, wherein the instructions are further configured to cause the computer system to at least determine, in a topological relationship graph, an associated node in turn with a node for the candidate road data as a starting point, and determine the geographic object from the electronic map data based on the node,
   wherein the topological relationship graph is constructed based on a connection relationship between a plurality of road data, and
   wherein the plurality of road data comprise the candidate road data, and each of the plurality of road data is used as one node.

16. The non-transitory computer-readable storage medium of claim 13, wherein the instructions are further configured to cause the computer system to at least:
   determine a preset region based on the location data and a reference road size; and
   determine, from the electronic map data, road data within the preset region as the candidate road data.

17. The non-transitory computer-readable storage medium of claim 13, wherein the instructions are further configured to cause the computer system to at least:
   perform a tokenization on the traffic event text to obtain a road identification and a road stake number; and
   determine the location data based on the road identification and the road stake number.

18. The non-transitory computer-readable storage medium of claim 13, wherein the traffic event text comprises a road condition information, and
   wherein the instructions are further configured to cause the computer system to at least update a road condition of a target road corresponding to the target road data based on the road condition information.

\* \* \* \* \*